United States Patent [19]

Douno

[11] 4,150,740

[45] Apr. 24, 1979

[54] MONEY EXCHANGING SYSTEM

[75] Inventor: Syugo Douno, Himeji, Japan

[73] Assignee: Glory Kogyo Kabushiki Kaisha, Himeji, Japan

[21] Appl. No.: 841,324

[22] Filed: Oct. 11, 1977

Related U.S. Application Data

[63] Continuation-in-part of Ser. No. 680,522, Apr. 26, 1976, abandoned.

[30] Foreign Application Priority Data

May 2, 1975 [JP] Japan .................................. 50-53626

[51] Int. Cl.² .............................................. G07F 7/04
[52] U.S. Cl. .................................................. 194/4 C
[58] Field of Search ........................ 194/4 C, 4 E, 10; 133/4

[56] References Cited

U.S. PATENT DOCUMENTS 3,190,426  6/1965  Cahill et al ........................ 194/10 X Primary Examiner—Stanley R. Tollberg
Attorney, Agent, or Firm—Wenderoth, Lind & Ponack

[57] ABSTRACT

A system of exchanging money in a money exchanging machine in which different money groups each consisting of money of a single or a plurality of denominations are provided for each of the money of different denominations to be exchanged by the machine, and a customer selects only one of the money groups to cause the machine to achieve the money exchanging.

1 Claim, 3 Drawing Figures

MONEY EXCHANGING SYSTEM

This application is a continuation-in-part of U.S. patent application, Ser. No. 680,522, filed Apr. 26, 1976, now abandoned.

BACKGROUND OF THE INVENTION

This invention relates to a money exchanging system.

In conventional money exchanging machines, the denomination of money inserted into the machine for exchange is only one, and the denomination of money dispensed by the machine is also only one. For instance, in a first conventional money exchanging machine, a 10,000-yen note is exchanged for ten 1,000-yen notes only, that is, the denomination of a note inserted into the machine is 10,000-yen only and that of notes dispensed are 1,000-yen only; and in a second conventional money exchanging machine, a 1,000-yen note is exchanged for ten 100-yen coins only, that is, in this machine also the denomination of a note inserted thereinto is 1,000-yen only and that of coins dispensed is 100-yen only.

Since in the conventional money exchanging machine both of the denominations of money inserted into and dispensed by the machine are predetermined, as was described above, it is sometimes impossible for a customer to exchange his money by the machine, and he is sometimes forced to exchange it for money undesired. This will become more apparent from the following. It is assumed that the two conventional money exchanging machines described above are provided and a customer wants to have a 10,000-yen note in 100-yen coins. In this case, first he exchanges the 10,000-yen note for ten 1,000-yen notes by the first machine, and then he exchanges one of the ten 1,000-yen notes for ten 100-yen coins by the second machine. Thus, he has to operate two money changing machines to obtain 100-yen coins. Furthermore, even if he wants to exchange a 1000-yen note for five 100-yen coins and one 500-yen note, such money exchange cannot be achieved by those machines.

Recently, money exchanging machines have been proposed in which money of a single denomination or any one of the money of different denominations can be exchanged, and upon insertion of the money a plurality of monetary denominations indicated respectively with total monetary values to be dispensed available for exchanging the money are displayed by means of lamps, and in which a desired one or ones out of the denominations with the respective total monetary values are selected until the sum of the total monetary values reaches the value of the money inserted into the machine. For instance, one of the conventional money exchanging machines of this type can exchange any one of 10,000-yen, 5000-yen and 100-yen notes, and is provided with a number of selection buttons so that a variety of money groups are available for money exchange. Upon insertion of one of these bank notes, some of the selection buttons relating to the denominations with the respective total monetary values available for the monetary value of that bank note are all illuminated by lamps. With respect to the dispensation of 1000-yen notes, a one-selection button (1000-yen), a five-sheet selection button (5000-yen), and a ten-sheet selection button (10,000-yen) are provided. With respect to the dispensation of 100-yen coins, a 50-piece selection button (5,000-yen) and a 100-piece selection button (10,000-yen) are provided.

In this conventional money exchanging machine, upon insertion of a 10,000-yen note for instance, all of the selection buttons relating to 10,000-yen or less are illuminated by the lamps. If under this condition the customer depresses the five-sheet selection button (5,000-yen), the lamps for the selection buttons relating to monetary values more than 5,000-yen are turned off, but the lamps for the selection buttons relating to monetary values less than 5,000-yen inclusive are maintained turned on. If he then depresses the 50-pieces selection button (5000-yen), all the lamps are turned off because the sum of the monetary values selected by these selection buttons is equal to the monetary value of the bank note inserted into the machine. Then, the depression of an exchange button causes the machine to dispense five 1000-yen notes and fifty 100-yen coins.

However, the conventional money exchanging machine of this type is disadvantageous in that it is relatively intricate in operation which may lead to erroneous operation because a number of selection buttons are provided in all directions on the operating panel, and a customer must frequently depress the selection buttons until the sum of the monetary values selected by depressing them reaches the monetary value of the bank note inserted into the machine. Furthermore, the control mechanism of the machine is relatively complicated, and accordingly the machine is high in manufacturing cost. The complicated control mechanism leads to difficulty in inspection and maintenance.

SUMMARY OF THE INVENTION

Accordingly, an object of this invention is to provide a system of exchanging money in which all of the difficulties described above accompanying a conventional money exchanging machine have been overcome.

More specifically, an object of this invention is to provide a system of exchanging money in which money exchange is achieved by selecting only one of the money groups provided for each money to be exchanged.

The foregoing object and other objects has been achieved by providing according to this invention.

A system of exchanging money in a money exchanging machine in which different groups of money each consisting of money of a single or a plurality of denominations are provided for each of the money of different denominations which is to be inserted into the machine for money exchange by a customer, and selection of a desired one out of the groups of money provided for the money inserted into the machine is made by the customer, the only one selection causing the machine to achieve the money exchange.

The nature, principle and utility of this invention will become more apparent from the following detailed description and the appended claim when read in conjunction with the accompanying drawings, in which like parts are designated by like reference characters.

DETAILED DESCRIPTION OF THE INVENTION

Figure 1:
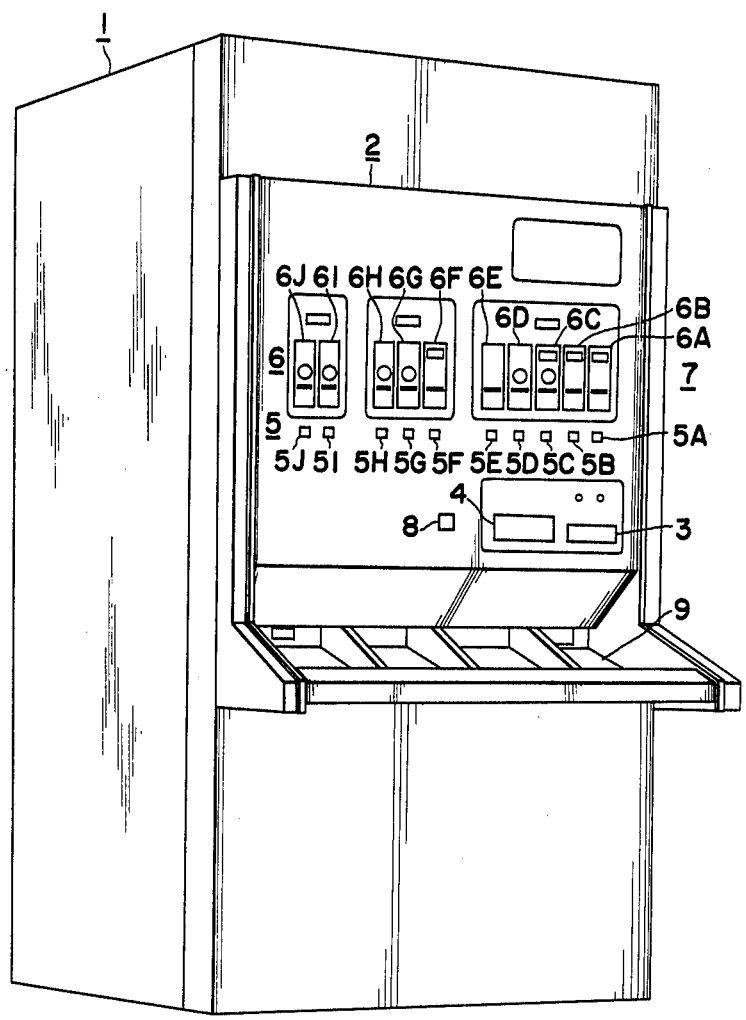
FIG. 1 is a perspective view of a money exchanging machine embodying a money exchanging system according to this invention.

A money changing machine 1 utilizing this invention, as shown in FIG. 1, has a front panel 2 which can be opened when required, a money inserting opening 3 provided on the front panel for a customer to insert a piece of money such as a bank note into the machine 1 to be changed, and an operating condition display window 4 provided also on the front panel 2 for displaying the operating conditions of the machine 1 by the use of terms such as "SERVICEABLE" that is, the machine is serviceable for changing money, "WAIT A MINUTE" that is, the machine will become serviceable soon, or "UNSERVICEABLE", that is, the machine is unserviceable owing to certain reasons.

Furthermore, the front panel 2 is provided with money group selecting buttons 5A–5J by which a customer can select, as desired, one of the groups of money (described later in detail) which have been provided in the machine 1 for exchange for the piece of the money such as bank notes to be changed, these selecting buttons 5A–5J being identified by money group identifying plates 6A–6J provided in the vicinity thereof, respectively, and a money returning button 8 which is operated to return the piece of money inserted into the machine to the customer when he decides not to carry out the money changing operation after inserting the money into the machine. The machine 1 has money dispensing outlets 9 below the panel 2 into which money is dispensed so that a customer can receive it.

The combination of the money group selected buttons 5A–5J and the money group identifying plates 6A–6J will be referrred to as "change operation setting means" hereinafter.

For convenience of description, it is assumed that the pieces of money to be changed by the machine 1 are 10,000-yen, 5,000-yen and 1,000-yen banknotes.

For changing of a 10,000-yen note, five groups of money are provided: a first group consisting of ten 1,000-yen notes, a second group consisting of two stacks of 100-yen coins, each stack including fifty 100-yen coins, a third group consisting of twenty stacks of 10-yen coins each stack including fifty 10-yen coins, a fourth group consisting of nine 1,000-yen notes plus ten 100-yen coins, and a fifth group consisting of five 1,000-yen notes plus one stack of fifty 100-yen coins. For changing of a 5,000-yen bank note, three groups of money are provided: a first group consisting of five 1,000-yen notes, a second group consisting of one stack of fifty 100-yen coins, and a third group consisting of ten stacks of fifty 10-yen coins. For changing of a 1,000-yen bank note two groups of money are provided: a first group consisting of two stacks of fifty 10-yen coins, and a second group consisting of ten 100-yen coins. It should be noted that the number of money groups and the contents of each money group described above are merely by way of example.

The money exchanging machine described above, as shown in FIG. 2 further comprises: a conventional money judging device 10 adapted to judge whether or not a piece of money inserted into the money inserting opening 3 is acceptable; a conventional selection circuit 11 for producing a money dispensing signal DM representative of a group of money which has been selected or determined in response to a judgement signal DN from the money judging device 10 and also to a selection signal SL from the exchange operation setting means 7; a conventional dispensation control circuit 12 for causing a money dispenser 13 to dispense money in response to the money dispensing signal DM applied thereto, and a conventional money detecting device 14 for detecting the amounts of money dispensed by the money dispenser 13 and feeding back the detected amount to the dispensation control circuit 12.

Figure 2:
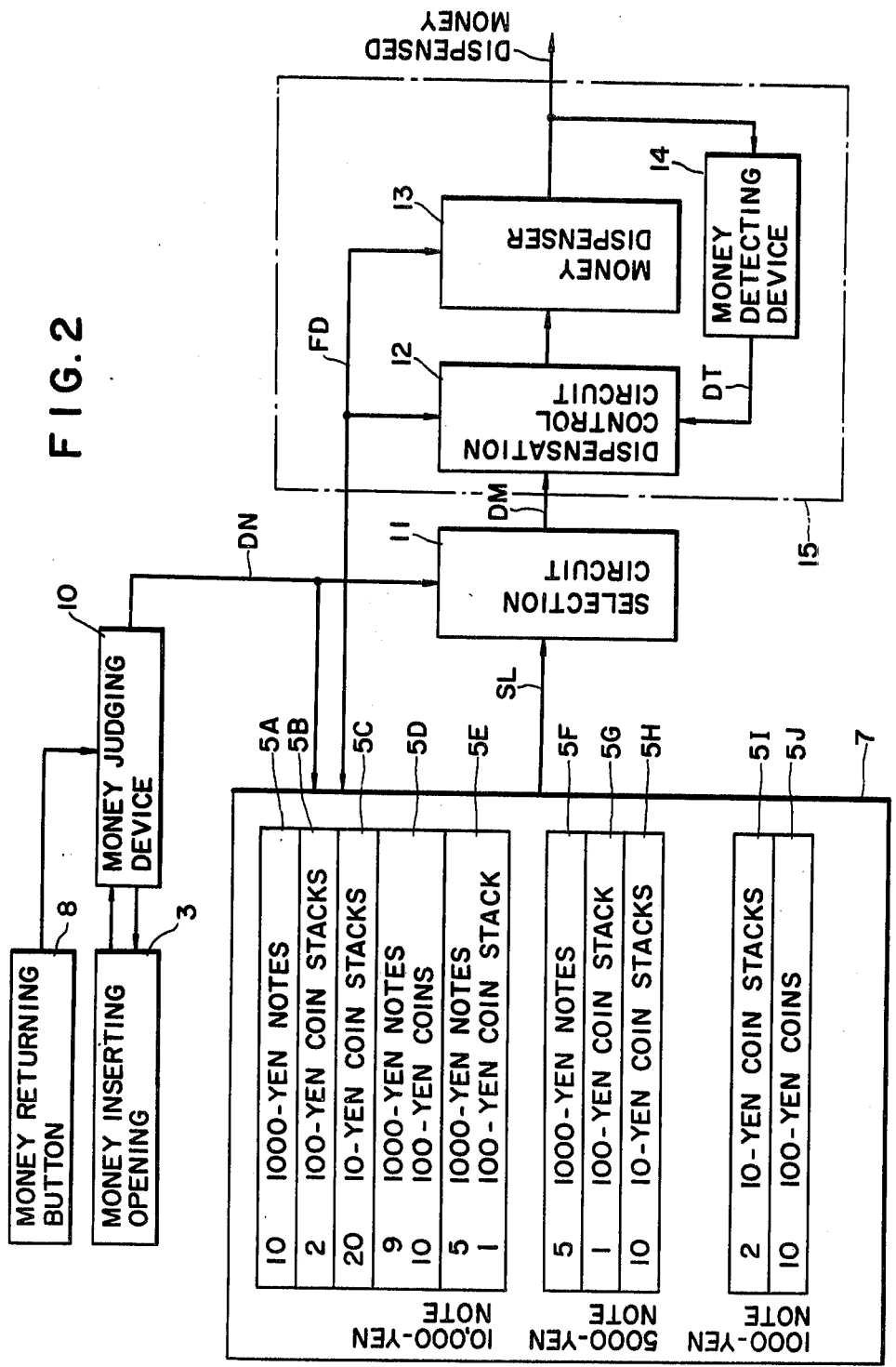
FIG. 2 is a block diagram illustrating a control system for the money exchanging apparatus shown in FIG. 1.
Figure 3:
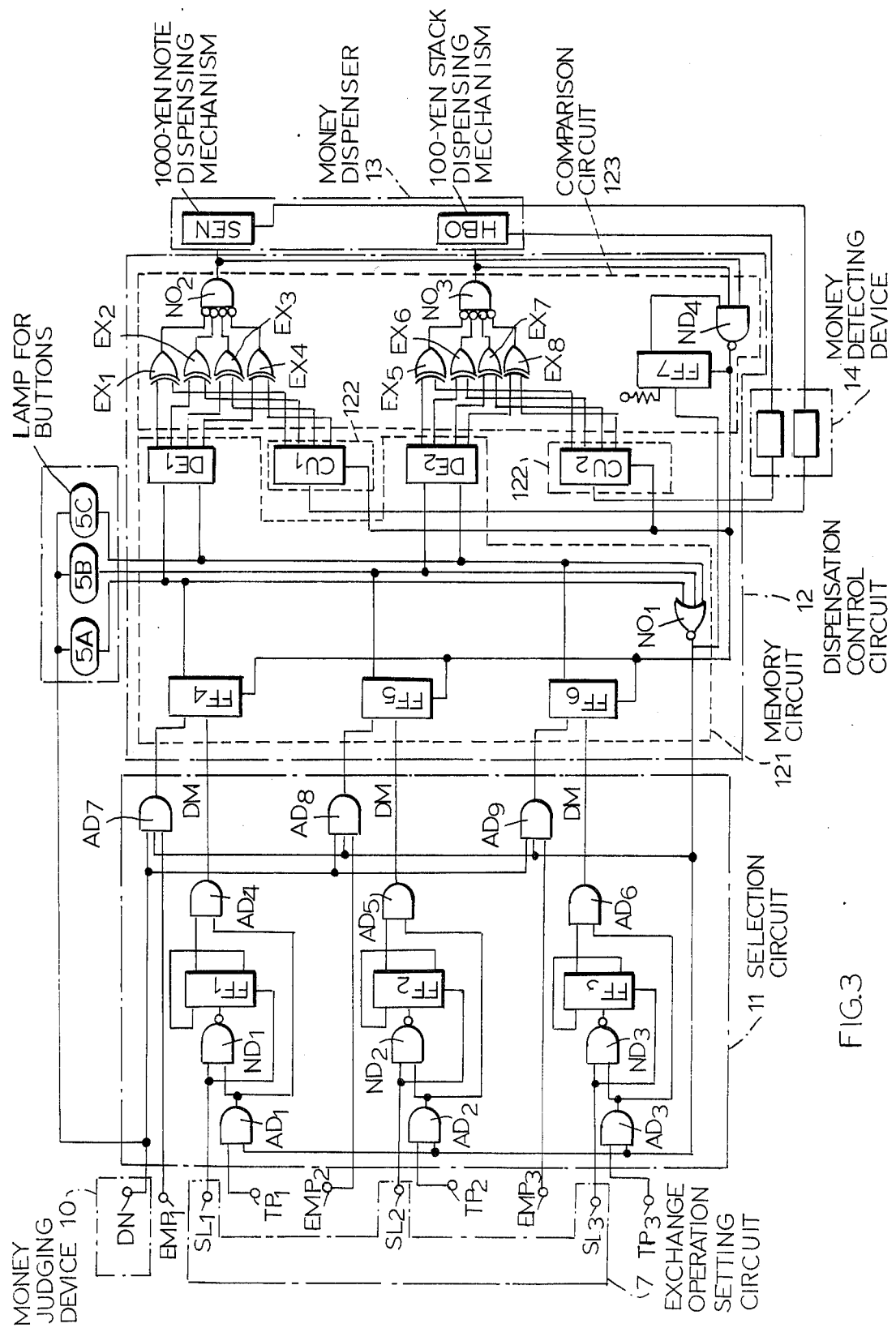
FIG. 3 is a detailed circuit diagram of the parts of the block diagram of FIG. 2.

Shown in FIG. 3 is an electrical circuit illustrating in detail the block diagram of FIG. 2. For simplification in description, the circuit will be described with reference to the operation where, for exchange of a 10,000-yen note, three groups of money are provided: a first group consists of ten 1,000-yen notes; a second group two stacks of 100-yen coins, each stack including fifty 100-yen coins; and a third group five 1,000-yen notes plus one stack of 100-yen coins.

The exchange operation setting means 7 produces a selection signal SL upon depression of the money group selecting buttons 5. More specifically, selection signals $SL_1$, $SL_2$ and $SL_3$ are produced by the exchange operation setting means 7 upon depression of the buttons for the first, second and third money groups, respectively.

The selection circuit 11 comprises AND circuits $AD_1$, $AD_2$ and $AD_3$, NAND circuits $ND_1$, $ND_2$ and $ND_3$, flip-flop circuits $FF_1$, $FF_2$ and $FF_3$, and AND circuits $AD_4$, $AD_5$ and $AD_6$ so that even if all of the selecting buttons 5 are simultaneously depressed, only one money dispensing signal DM is outputted with the aid of timing signals $TP_1$, $TP_2$ and $TP_3$ from a timing pulse generating circuit (not shown). Furthermore, the selection circuit 11 has the judgement signal DN concerning the 10,000-yen note from the money judging device 10 supplied to AND circuits $AD_7$, $AD_8$ and $AD_9$, so that the exchange pattern described above is effective only when a 10,000-yen note is inserted into the machine.

The dispensation control circuit 12 is made up of a memory circuit 121, counter means 122, and a comparison circuit 123. The memory circuit 121 comprises D-type flip-flops $FF_4$, $FF_5$ and $FF_6$, and decoders $DE_1$ and $DE_2$. The memory circuit 121 operates to store the money dispensing signal DM, to turn on a lamp 5A, 5B or 5C corresponding to the money group selecting button 5 depressed, and to introduce to the comparison circuit 123 the numerical value of money to be dispensed. The counter means 122 is a decimal counter adapted to count the detection signals DT produced by the money detecting device 14. The counter means 122 comprises two counters $CU_1$ and $CU_2$. The comparison circuit 123 serves to compare the numerical data of the decoders $DE_1$ and $DE_2$ with the count data of the counters $CU_1$ and $CU_2$. The comparison circuit 123 comprises EXCLUSIVE OR circuits $EX_1$ through $EX_4$, and $EX_5$ through $EX_8$, NOR circuits $NO_2$ and $NO_3$, a D-type flip-flop circuit $FF_7$, and a NAND circuit $ND_4$.

(In FIG. 3, the money dispenser 13 is shown as having only a money dispensing mechanism SEN for dispensing 1,000-yen notes and a money dispensing mechanism HBO for dispensing stacks of 100-yen coins, in order to simplify the Figure. However, it should be noted that the dispenser 13 can dispense all of the money groups shown in FIG. 1).

Now, the operation of the money exchanging machine will be described with reference to the case where five 1,000-yen notes and one stack of 100-yen coins are dispensed for a 10,000-yen note.

Upon insertion of a 10,000-yen note into the money inserting opening 3, the denomination signal of the 10,000-yen note is outputted as the judgement signal DN by the money judging device 10, while the lamps for the money exchange selecting buttons 5A, 5B and 5E (though FIG. 1 includes 5C and 5D) are turned on. Then, by depressing the botton 5E the selection signal $SL_3$ is outputted, whereby the flip-flop circuit $FF_3$ is set with the aid of the timing signal $TP_3$, and a high level signal (hereinafter referred to as an "H" signal, when applicable) is produced by the AND circuit $AD_6$. To the AND circuit $AD_9$ are applied a signal $EMP_3$ representative of the fact that a sufficient number of 1,000-yen notes and stacks of 100-yen coins are available for dispensation, the output signal of a NOR circuit $NO_1$ which is representative of the fact that no pattern is selected, and the judgement signal DN. As a result, an "H" signal is produced by the AND circuit $AD_9$, and the flip-flop circuit $FF_6$ of the memory circuit 121 is therefore set, whereupon a low level signal (hereinafter referred to as an "L" signal, when applicable) is produced by the NOR circuit $NO_1$; therefore, even if selection operation is carried out thereafter, it is blocked (or prohibited) by means of the AND circuits $AD_1$, $AD_2$ and $AD_3$.

The set output of the flip-flop circuit $FF_6$ is applied to the decoders $DE_1$ and $DE_2$. As a result, the binary signal for "5," or "L·H·L·H," is outputted through the terminals $Q_A$, $Q_B$, $Q_C$ and $Q_D$ of the decoder $DE_1$ so as to dispense five 1,000-yen notes, while the binary signal for "1," or "L·L·L·H," is outputted through the terminals $Q_A$, $Q_B$, $Q_C$ and $Q_D$ of the decoder $DE_2$ so as to dispense one stack of 100-yen coins. However, as nothing is counted by the counters $CU_1$ and $CU_2$ at present, signals "L·L·L·L" are produced at the terminals $Q_A$, $Q_B$, $Q_C$ and $Q_D$ of these counters $CU_1$ and $CU_2$, and accordingly the NOR circuits $NO_2$ and $NO_3$ produce non-coincidence signals "L." Therefore, the money dispensing mechanisms SEN and HBO operate to dispense five 1,000-yen notes and one stack of 100-yen coins, respectively. The notes and coins thus dispensed are separately detected by the money detecting device 14 and the detection signals thereof are applied to the counters $CU_1$ and $CU_2$ wherein the notes and coins are counted. When the count results thereof coincide with the data in the decoders $DE_1$ and $DE_2$, the NOR circuits $NO_2$ and $NO_3$ produce "H" signals. As a result, the operations of the money dispensing mechanisms SEN and HBO are suspended. Then, the "L" signal is produced by the NAND circuit $ND_4$. Therefore, all of the counters $CU_1$ and $CU_2$ and the flip-flop circuits $FF_4$, $FF_5$ and $FF_6$ are cleared, and the lamp for the button selected is turned off. Thus, one exchange operation has been completed.

The operation of the circuit has been described with respect to the case where three money groups (or money selecting buttons) 5A, 5B and 5E are provided for exchange of a 10,000-yen note; however, it will be obvious that a circuit similar to the above-described circuit can be employed for exchanging a 5,000-yen note or a 1,000-yen note.

In the same manner as described above, when a 1000-yen bank note is inserted into the money inserting opening 3 and the money group selecting button 5J is depressed, the contents of the corresponding money dispensing signal DM are representative of a ten 100-yen coins.

Thus, when a bank note to be changed is inserted into the money inserting opening 3 and accordingly into the machine 1 and one of the money group selecting buttons relating to change for such a bank note is depressed, the resultant money dispensing signal DM produced by the selection circuit 11 is representative of a money group selected by that selecting button.

Furthermore it should be noted that if a customer depresses the money returning button 8 before depressing a money group selecting button, the money he has inserted into the machine 1 will be returned to him.

The money containers of the money dispenser may be provided respectively for the money group selecting buttons, or a single money container containing money of a single denomination may be provided commonly for a plurality of money group selecting buttons which designate the dispensation of money of that denomination. For instance, two money containers containing 1,000-yen notes may be provided respectively for the money group selecting buttons 5A and 5F, or one money container containing 1,000-yen notes may be provided commonly for the two selecting buttons 5A and 5F. In the former case, upon insertion of a 10,000-yen note ten 1,000-yen notes are dispensed from one money container, and upon insertion of a 5,000-yen note five 1,000-yen notes are dispensed from another money container. In the latter case, the ten 1,000-yen notes and the five 1,000-yen notes are dispensed from the same money container.

According to the money exchanging system according to this invention, as is apparent from the above description, a plurality of groups of money each consisting of money of a single or a plurality of denominations are provided for each of the pieces of money of different denominations to be changed so that a customer can select a desired one out of the plurality of groups of money equal to the value of the piece of money inserted into the machine by him, that is, the money changing is effected by selecting only one out of the plurality of groups of money.

Thus, a plurality of pieces of money of different denominations can be changed by the machine, and this is convenient for customers because they can change money of different denominations by the use of only one money changing machine. Furthermore, money changing is automatically effected merely by selecting only one out of the groups of money each consisting of money of a single or a plurality of denominations. This simplifies the operation of the money changing machine and facilitates the money changing transaction in banks or the like.

While the invention has been described in connection with the changing of 10,000-yen, 5,000-yen and 1,000-yen bank notes into five, three, and two groups of money, respectively, it is particularly understood that the invention is not limited thereby or thereto. That is, the denomination of the piece of money to be changed is optional, and the number of groups of money provided for each of the pieces of money to be changed is also optional. Furthermore, the dispensation control circuit 12, as was described, comprises the memory circuit, the counter, and the comparison circuit; however, it may be constituted by a preset counter.

What is claimed is:

1. A money changing system comprising:
   (a) money judging means for judging whether or not a piece of money having one of a plurality of different denominations and inserted into said system for being changed is acceptable;

(b) exchange operation setting means having manually actuable selecting means for selecting any one of a plurality of groups of money for each denomination piece of money to be changed, each group consisting of money of a single or a plurality of denominations and in each said group the total value of the money being equal to the value of the denomination of the corresponding piece of money to be changed, and said exchange operation setting means being coupled to said money judging means for producing, in response to an indication that a piece of money inserted into said system has been judged acceptable, a selection signal corresponding to one of said groups of money in response to a manual selection by the user of the system;

(c) selection means coupled to said money judging means and said exchange operation setting means for receiving said selection signal and producing a money dispensing signal representative of a group of money which has been manually selected in response thereto;

(d) a money dispensing means for dispensing money of the selected group in response to said money dispensing signal;

(e) money detecting means coupled to said money dispensing means for detecting the amounts of money dispensed by said money dispensing means and producing a detection signal; and (f) dispensation control means coupled between said selection means and said money dispensing means and to which the output of said money detecting means is coupled and for causing said money dispensing means to dispense money on receipt of said money dispensing signal, and for counting the detection signals produced by said money detecting means, and when a monetary value corresponding to said money dispensing signal coincides with the monetary value counted by said detection signals, for suspending the money dispensing operation of said money dispensing means, whereby a user can selectively designate a desired one out of the plurality of groups of money to be received as change for a piece of money, and as a result of such designation the selected group of money is dispensed.

* * * * *